US006769533B2

(12) United States Patent
Suer

(10) Patent No.: US 6,769,533 B2
(45) Date of Patent: Aug. 3, 2004

(54) METHOD AND DEVICE FOR CONVEYING BULK MATERIAL

(75) Inventor: Ulrich Suer, Rehburg (DE)

(73) Assignee: Claudius Peters Technologies GmbH, Buxtehude (DE)

(*) Notice: Subject to any disclaimer, the term of this patent is extended or adjusted under 35 U.S.C. 154(b) by 0 days.

(21) Appl. No.: 10/257,269

(22) PCT Filed: Apr. 2, 2001

(86) PCT No.: PCT/EP01/03734

§ 371 (c)(1), (2), (4) Date: May 9, 2003

(87) PCT Pub. No.: WO01/77599

PCT Pub. Date: Oct. 18, 2001

(65) Prior Publication Data

US 2003/0177658 A1 Sep. 25, 2003

(30) Foreign Application Priority Data

Apr. 10, 2000 (DE) ........................................ 100 17 324

(51) Int. Cl.[7] ................................................ B65G 25/00
(52) U.S. Cl. ....................................................... 198/773
(58) Field of Search ........................... 198/773; 34/164; 110/328, 290; 432/77

(56) References Cited

U.S. PATENT DOCUMENTS 1,538,192 A * 5/1925 Leach ........................... 34/65
2,431,799 A * 12/1947 Gaffney ........................ 34/164
2,879,983 A 3/1959 Sylvest
3,624,920 A * 12/1971 Coutelan ...................... 34/164
3,802,553 A * 4/1974 Schrawder .................. 198/773
4,320,710 A * 3/1982 Steiner et al. .............. 110/281
4,337,857 A * 7/1982 Schneider .................... 198/773
4,350,244 A * 9/1982 Heinemann et al. ........ 198/773
5,890,888 A * 4/1999 Enkegaard ................... 432/77

FOREIGN PATENT DOCUMENTS

| | | |
|---|---|---|
| DE | 352283 | 2/1961 |
| DE | 196 49 921 A1 | 6/1998 |
| WO | WO 98/48231 | 10/1998 |

* cited by examiner

*Primary Examiner*—Richard Ridley
(74) *Attorney, Agent, or Firm*—Morrison & Foerster LLP

(57) ABSTRACT

The invention relates to a device (1) for conveying bulk material, particularly, cement clinker (2), in a cement cooler (3). The invention device is essentially comprised of a number of grate bars (5) arranged one behind the other, which can be moved forward and backward by means of a common drive (7). The grate bars (5) each have a formation (11) through which, in a forward travel position (10), a cavity (14) is produced between the formation (11) and a protective layer (6). During return travel, the grate bar (5) can be retracted into said cavity (14) without an appreciable amount of bulk material (2) being conveyed counter to the direction of conveyance (9).

22 Claims, 3 Drawing Sheets

METHOD AND DEVICE FOR CONVEYING BULK MATERIAL

FIELD OF THE INVENTION

The invention relates to a method of transporting bulk material, in particular cement clinker through a cement cooler, in which a plurality of grate bars that can move one behind another on a gas-permeable protective layer execute a forward stroke and a return stroke. Furthermore, the invention relates to an apparatus for implementing the method.

BACKGROUND OF THE INVENTION

The preferred application for equipment of this type is the conveyance of hot bulk material, in particular cement clinker, over a protective layer, the bulk material being cooled from below by means of a gas flowing in. Here, the grate bars are moved to and fro in the conveying direction and, during each operation, with their forward stroke face thus convey a volume of the bulk material through the cooler in the direction of an outlet end. In this case, the movement of the grate bars in the conveying direction is designated the forward stroke, the movement counter to the conveying direction the return stroke. If, in the following text, mention is specifically made of cement clinker, this is also intended to mean bulk material in general.

The conveying performance of the transport method is influenced critically by the difference between the volume of cement clinker moved during each forward stroke in the conveying direction and the volume undesirably moved counter to the conveying direction during the return stroke movement. The efficiency is therefore determined critically by the configuration of the grate bars.

Apparatuses are known which alternatively have fixed rows of grate plates and moveable rows of grate plates, which overlap one another in an imbricated manner. The rows of grate plates comprise grate plates arranged beside one another. By means of the moveable grate plates, a volume of the cement clinker is pushed in the direction of the outlet end during the forward stroke, while during the return stroke, the undesired backward transport of the cement clinker conveyed is restricted by the cement clinker being wiped off by the rear face of the moveable grate plates. In this case, the fixed grate plates prevent cement clinker being transported counter to the conveying direction. The imbricated arrangement makes it possible for the moveable grate plates to be pushed under the stationary grate plates during the return stroke. For the purpose of cooling, the cooling gas is led from below through the cement clinker layer to be cooled during the transport operation. In this case, the gas used for cooling is intended to be able to pass largely unhindered through the grate plates. For this purpose, passage openings, for example in the form of holes or slots, are provided on the rear face of the grate plate.

It has proven to be disadvantageous in practice that, depending on the abrasiveness of the cement clinker to be treated, a considerable material wear on the grate plates occurs in the movement gap between fixed and moveable grate plates. As a result of the movement gap becoming larger, an increasing proportion of the cement clinker trickles downward between the grate plates and has to be transported away with a great deal of effort. Cement clinker particles which are swirled up lead to removal of material and in this way to premature aging of the apparatus.

Furthermore, U.S. Pat. No. 2,904,323 discloses an apparatus in which, between the substantially wedge-like grate bars there is in each case arranged a likewise wedge-like scraper. Likewise, U.S. Pat. No. 3,010,218 shows the alternating arrangement of moveable grate bars which, in this case, have a very flat rear face and, in cooperation with a wedge-like shape of the area between the individual grate bars, prevent the undesired backward transport of the cement clinker. The grate bars are connected by means of a frame or a plurality of connecting elements and therefore, by means of a common drive, can be set into an oscillatory movement parallel to the conveying direction. The grate bars therefore have a cross section which is approximately triangular or wedge-like, the forward stroke face being inclined substantially more steeply with respect to the conveying direction than the rear face which, as a result, opposes a considerably lower resistance to the cement clinker slipping back during the return stroke. In this way, the intention is for more material to be conveyed in the forward stroke than in the return stroke, in order in this way to convey the cement clinker through the cooler.

Furthermore, WO98/48231A1 discloses a simplified cooling apparatus which has successive moveable grate bars, a stationary retention element arranged between them being dispensed with. In this case, according to a specific exemplary embodiment, individual ones of the bars can also have a symmetrical cross-sectional area.

In practice, it has proven to be disadvantageous in the known transport apparatuses that the efficiency of the transport performance can certainly be increased by suitable shaping of the grate bars but, nevertheless, considerable losses of performance occur. Even when use is made of retaining means which are arranged between the moveable grate bars, a considerable part of the backward transport reduced by the retaining means is canceled out again by the simultaneously increased resistance in the conveying direction. In addition, in this case mixing of the cement clinker to be conveyed occurs, as a result of which the efficiency of the cooling is disadvantageously reduced.

The grate bars are subjected to considerable wear. As a result, the shape of the cross section of the grate bar becomes increasingly rounded, which impairs the conveying performance. In order to compensate for the decreasing conveying performance, the stroke frequency has to be increased. As a result, with increasing wear, more and more strokes are required to convey the same quantity of cement clinker. As a result of the increasing stroke frequency, the wear progresses faster and faster, at the same time the required drive power increasing.

SUMMARY OF THE INVENTION

Against this background, the invention is based on the object of developing a method of the type cited at the beginning in such a way that the conveying performance can be increased substantially as a result. At the same time, the susceptibility to wear is to be reduced. Furthermore, an apparatus for implementing the method is to be provided.

According to the invention, the first-named object is achieved by a cavity closed off with respect to the cement clinker being formed by the forward stroke of the grate bar, into which cavity the grate bar moves during the subsequent return stroke movement without substantial material transport counter to the forward stroke movement. In this way, undesired backward transport of the cement clinker during the return stroke is prevented, by cement clinker being prevented from sliding into the return stroke area of the grate bar by the formation of the cavity. Accordingly, the engagement of the grate bar in the cement clinker during the return stroke is largely prevented, the cement clinker resting on the return face and, as a result, not being shifted or being shifted only insignificantly. It therefore becomes possible to dispense with the use of stationary, immovable grate bars entirely, so that in addition to the low outlay on manufacture, at the same time the efficiency is also increased. In particular, a movement gap between the stationary and the moving grate plates is dispensed with as a result. Here, the cement clinker is transported by the successive grate bars in the manner of steps over the rear face of the following grate bar into the forward stroke area of the latter, so that mutual impeding of the individual grate bars is also ruled out. In particular, the grate bars convey the cement clinker obliquely upward with respect to the conveying direction, as a result of which the frictional resistance of the cement clinker, caused by the forward stroke movement on the protective layer, is reduced by the partial lifting of the conveyed cement clinker volume. Mixing of the cement clinker to be conveyed is also reduced considerably because of the omitted backward transport, as a result of which the efficiency of the cooling process can be improved further and the conveyed volume is largely independent of any wear which may possibly occur.

According to the invention, the second-named object, of providing an apparatus for transporting cement clinker through a cement cooler, having a plurality of grate bars which are arranged one behind another and spaced apart from one another and are arranged on a gas-permeable protective layer, in particular of compacted cement clinker, such that they can move between a return stroke position and a forward stroke position, the grate bars in each case having a forward stroke face that is inclined steeply with respect to the conveying direction and a flat rear face, is achieved in that the grate bar has a molded section by which, in the forward stroke position and together with the protective layer, a cavity that is closed off with respect to the cement clinker is formed, into which cavity the forward stroke face is moved when in the return stroke position. As a result, the movement of the grate bar in the return stroke is carried out largely without resistance into the cavity, it being possible for backward transport of the cement clinker counter to the conveying direction by the rear face to be largely avoided. At the same time, stationary grate bars or scrapers can be dispensed with, as a result of which, in addition to the outlay on manufacture and the outlay on maintenance, the availability of the plant and the throughput are increased at the same time. Here, even in the event of wear which may possibly occur and associated rounding of the forward stroke face, there is no or only an insignificant reduction in the conveying performance, since in this case the sliding of the cement clinker over the rear face is merely of lesser importance for the forward stroke performance of the grate bar. In particular, the conveyed material is stripped off without problems during the return stroke over the rear face of the grate bar, said material being held by a stationary layer of the cement clinker which, in this way, simultaneously performs the function of the immovable grate bars used according to the prior art. In this case, the protective layer can in principle have a preshaped and invariant composition or else consist of compressed or simply quiescent cement clinker and, as a result, protect the grate area against damaging temperature influences.

The grate bar can comprise a plurality of elements connected moveably to one another or have a flexible component, in order in this way to form the cavity in the forward stroke. On the other hand, an embodiment of the invention is particularly advantageous in which the grate bar rests with its rear face and its forward stroke face in each case on a section of the protective layer which is arranged in various planes parallel to the forward stroke direction of the grate bar. This results in a step-like or sawtooth-like construction of the grate bars arranged one after another, so that the cement clinker conveyed by the preceding grate bar can slide without problems over the rear face of the following grate bar. As a result, hindering the forward stroke by the following grate bar can be ruled out in a straightforward manner.

Another particularly expedient development of the present invention is also provided by the forward stroke face having a forward stroke active area perpendicular to the forward stroke direction of the grate bar which is greater than a return stroke active area perpendicular to the forward stroke direction of the grate bar. By this means, the volume of the cement clinker that can be moved during the return stroke of the grate bar is considerably lower as compared with the volume moved in the forward stroke. As a result, the efficiency of the transport apparatus is increased further. In this case, the forward stroke active area and the forward stroke face coincide only in the case of a forward stroke face arranged perpendicular to the conveying direction. Given an inclined arrangement of the forward stroke face or the return stroke face, the respective active area corresponds substantially to the projection of the face into the plane perpendicular to the forward stroke direction of the grate bar.

An advantageous modification of the invention is particularly well suited to this purpose if the grate bar has an angled section forming the forward stroke face. This provides, in a straightforward way, a grate bar whose rear face rests substantially flat on a section of the protective layer, while the angled section points downward and rests on a further section of the protective layer. In the area between the angled section and the rear face of the grate bar, the required cavity is thus formed during the forward stroke.

Another particularly recommendable modification of the present invention is achieved when the grate bar has a profiled piece which is open at the bottom, the forward stroke face being formed by at least an outer side of the profiled piece, and the rear face being formed by at least a further outer side of the profiled piece. By means of such shaping of the grate bar, trouble-free adaptation to different conditions of use can be achieved without problems. In particular, the conveying performance can as a result be improved additionally by means of differently shaped sections of the forward stroke face which, for this purpose, can also be adjustable or replaceable.

It is also particularly expedient if the grate bar is designed such that it can move substantially in the direction of the course of the rear face, in order in this way to configure the area acting on the cement clinker to be as small as possible. In this case, during the return stroke essentially only an end face of the rear face, facing away from the conveying direction, acts on the cement clinker, while the volume of the cement clinker resting on the rear face is not moved or moved only insignificantly counter to the conveying direction.

Another particularly advantageous refinement of the present invention is achieved by the forward stroke direction of the grate bar being inclined with respect to the conveying direction. Such a sawtooth-like construction of the successive grate bars thus permits unimpeded transport of the cement clinker over the rear face of the following grate bar without the following grate bar impeding the forward stroke.

For this purpose, a particularly effective development is provided by the forward stroke direction of the grate bar rising obliquely with respect to the conveying direction. As a result, the volume of the cement clinker to be conveyed during each forward stroke is simultaneously increased by a specific amount, as a result of which the movement in the conveying direction is made easier and, at the same time, the onward slippage of further cement clinker is made easier. Here, the cement clinker is pushed over the rear face of the following grate bar and supplied directly to the forward stroke zone of the following grate bar. Therefore, the rising forward stroke direction which is transferred to the cement clinker by the grate bar acts counter to the weight of the cement clinker, which reduces the friction between the cement clinker and the protective layer and therefore makes the conveying operation easier. In the return stroke, this results in an increase in the friction between the cement clinker and the protective layer, as a result of which the movement of the cement clinker counter to the conveying direction is made more difficult.

Also particularly effective is a modification in which an edge region of the rear face, facing away from the forward stroke direction, has a chamfer. During the return stroke, this chamfer reduces undesired movement of cement clinker counter to the conveying direction, in that the cement clinker can slide over the chamfer and, in the process, is merely lifted slightly.

Another advantageous refinement of the apparatus according to the invention is achieved when the grate bar can be moved on a curved path between a return stroke position and a forward stroke position. By this means, a further increase in the efficiency of the apparatus is achieved, in that the grate bars are initially guided rising obliquely on the protective layer and are then deflected substantially further in the conveying direction. Here, the forward stroke performance can largely be utilized in the conveying direction, it being possible for different grate bars to execute different movement paths.

Also suitable for this purpose is a further particularly recommendable modification in which the grate bar is arranged such that it can pivot about an axis, in order in this way to achieve a further simplification, in particular of the mechanism required for the drive, and therefore a reduction in the outlay on manufacture. In this case, the grate bar, for example, can be equipped substantially with a circular or oval cross section and with a depression or a protrusion having the forward stroke face. To this end, the axis runs centrally or eccentrically in the grate bar and in this way permits a rotational movement, it being possible for the grate bar both to circulate and to pivot back after reaching a predetermined pivoting angle, the transport of the cement clinker.

BRIEF DESCRIPTION OF THE DRAWINGS

The invention permits various embodiments. In order to illustrate its basic principle further, two of these are illustrated in the drawings and will be described below. In the drawings.

DETAILED DESCRIPTION OF THE INVENTION

Figure 1:
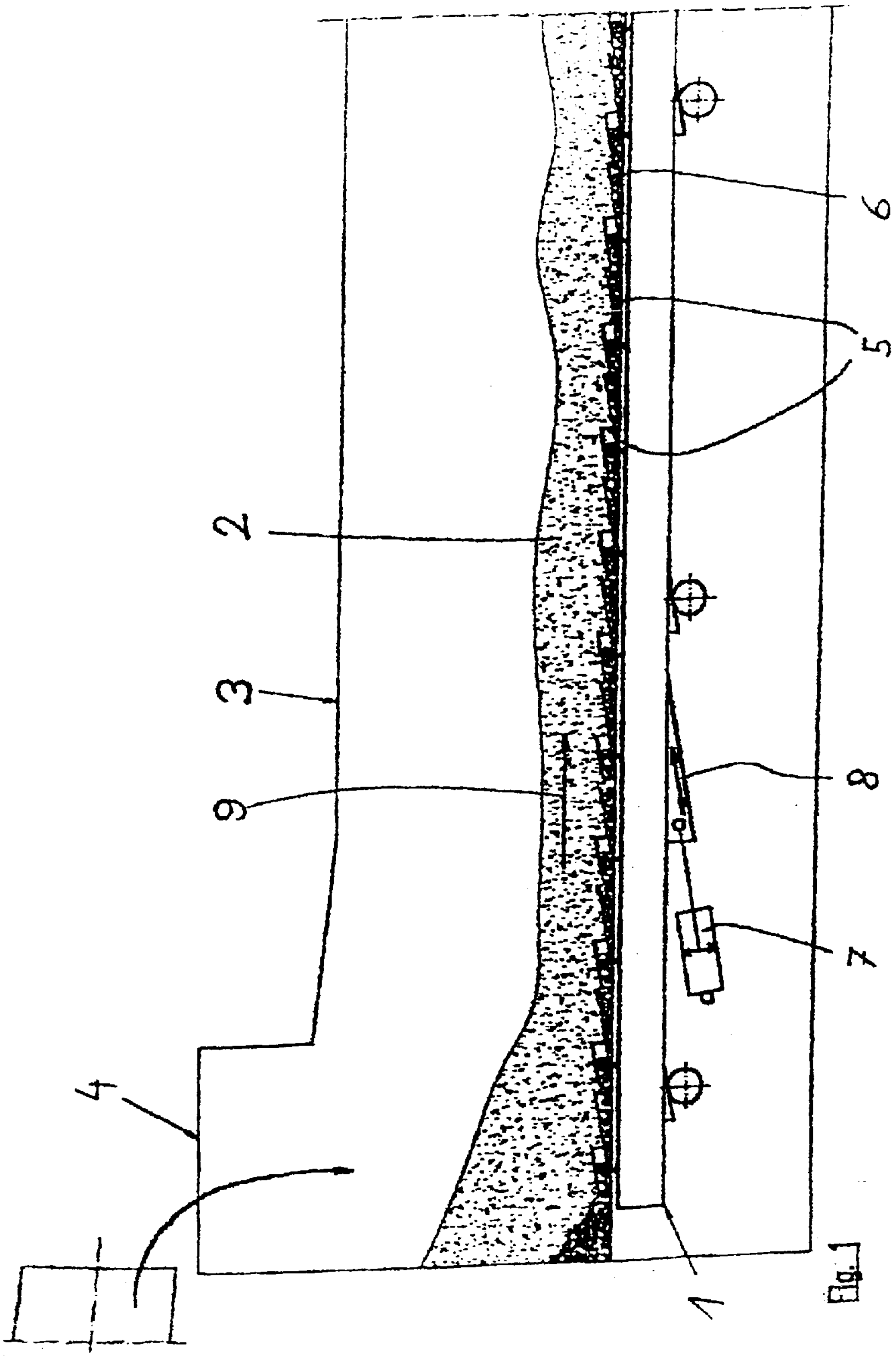
FIG. 1 shows a side view of an apparatus according to the invention.

FIG. 1 shows an apparatus 1 according to the invention for transporting cement clinker 2 through a cement cooler 3. For this purpose, the cement clinker 2 to be conveyed is introduced into the cement cooler 3 through an inlet opening 4 and transported in the direction of an outlet end, not illustrated, by means of the apparatus 1. For this purpose, the apparatus 1 has a plurality of grate bars 5 which are arranged one after another and which are arranged such that they can move to and fro at intervals over a carrier plate 21. Between the grate bars 5 and the carrier plate 21 there is a substantially quiescent or deposited and possibly compressed cement clinker layer 6. This cement clinker layer 6 acts as protective layer which protects the carrier plate 21 against the direct heat and wearing stress of the moving and hot layer 2 located above it. To this end, the grate bars 5 can be moved obliquely upward in the forward stroke direction 8 by means of a common drive 7. In this way, a volume of the cement clinker 2 is shifted periodically in the forward stroke direction 8 following the principle of a pusher, and is supplied to the following grate bars 5. As a result, the cement clinker 2 is moved step by step in the conveying direction 9, the supply of cooling gas from below being carried out at the same time.

Figure 2:
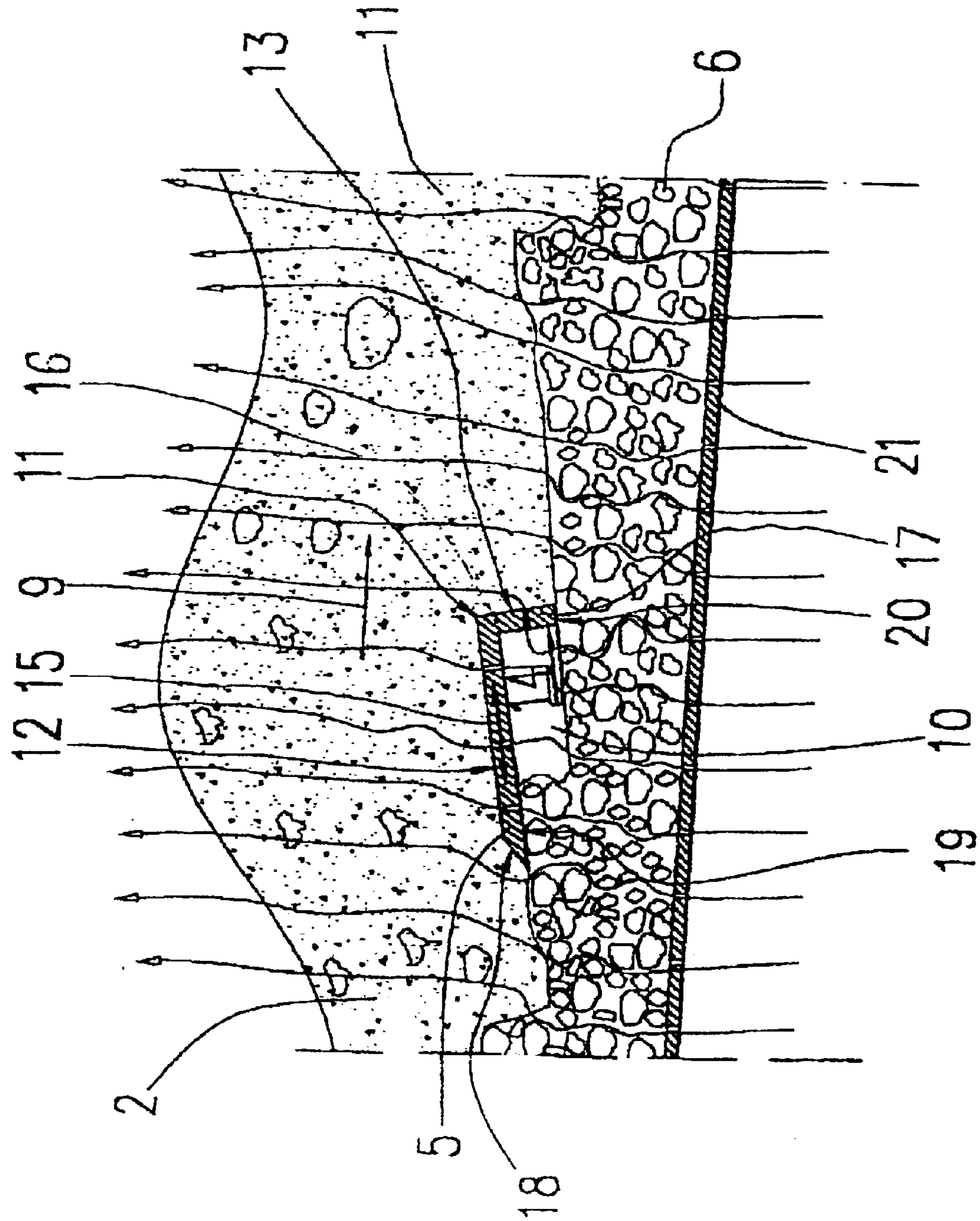
FIG. 2 shows an enlarged side view of a grate bar from the apparatus shown in FIG. 1.

The functioning of the grate bar 5 will also in addition be described by using FIG. 2, which shows a grate bar 5 in the forward stroke position 10 in an enlarged side view. In this forward stroke position 10, a cavity 14 is produced which is bounded by a molded section 11 of a rear face 12 and a forward stroke face 13 of the grate bar 5 and is closed off with respect to the cement clinker 2 and into which at least part of the grate bar 5 can be moved on its path into a return stroke position, not illustrated. For this purpose, the grate bar 5 can be displaced in a forward stroke direction 15 which is inclined with respect to the conveying direction 9. By means of a grate bar 5 provided with a profiled piece 16 and an angled section 17, a high efficiency in the forward stroke is achieved, while the cement clinker 2 only opposes a low resistance to the rear face 12 which, for this purpose, is additionally provided with a chamfer 18. Here, the grate bar 5 rests on the protective layer 6 which is formed by compressed cement clinker and, for this purpose, has a step-like or ramp-like composition. In this case, the rear face 12 of the grate bar 5 rests on a section 19 of the protective layer 6 whose plane, as referred to the forward stroke direction 15, is elevated with respect to the plane of a section 20 on which the forward stroke face 13 rests. By this means, the cement clinker 2 to be conveyed is guided obliquely upward in order to pass over the rear face 12 of a following grate bar 5 into the forward stroke area of the latter. As a result, the grate bars 5 arranged one after another are prevented from hindering the transport movement of the cement clinker 2. For the purpose of cooling, the gas with which the cement clinker 2 is treated flows first through the carrier plate 21, designed as a grate grid, for example, and then through the protective layer 6, in order then to cool the cement clinker 2. In the process, some of the gas first flows through the grate bar 5 before it escapes into the cement clinker 2 to be cooled. As the gas flows through the grate bar 5, the latter is cooled in a simple manner and in this way the thermal loading is reduced considerably.

Figure 3:
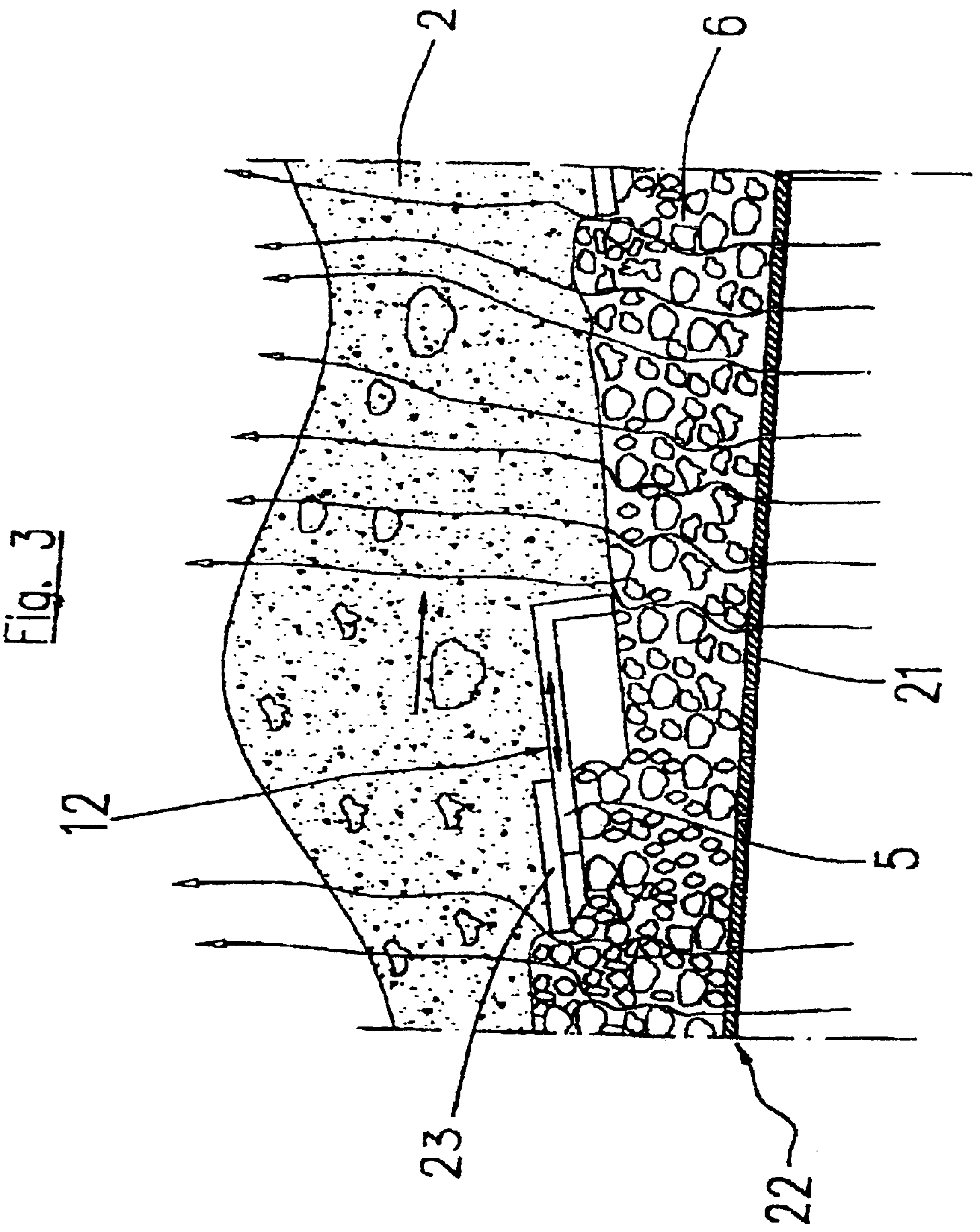
FIG. 3 shows a modification of an apparatus in a side view.

FIG. 3 shows a side view of an embodiment of an apparatus 22 which is modified by comparison. In this case, the rear face 12 of the grate bar 5 is additionally provided with an immovable covering 23, in order in this way to prevent the undesired penetration of cement clinker 2 through the slight remaining movement gap into lower areas of the protective layer 6 or of the grate grid 21.

Not illustrated are passage openings in the grate bar 5, which permit unimpeded passage of the gas required for cooling the cement clinker 2.

The apparatus is not restricted to the embodiments illustrated in the drawings. Instead, such grate bars can also be considered in which the grate bars can be displaced not just in one plane but, if appropriate, can also describe a curved path or can also be pivoted about an axis. In this case, apparatuses which are already present can be retrofitted with the apparatus according to the invention without difficulty and with only a little expenditure on construction.

What is claimed:

1. A method of transporting bulk material, through a cement cooler, comprising:

moving a plurality of grate bars one behind another on a gas-permeable protective layer in forward and return strokes, the forward stroke of the grate bar closing off a cavity with respect to the bulk material is formed into which the grate bar moves during the subsequent return stroke movement without substantial material transport counter to the forward stroke direction.

2. An apparatus for transporting bulk material through a cement cooler, comprising a gas-permeable protective layer of bulk material and a plurality of grate bars which are arranged one behind another and spaced apart from one another on gas-permeable protective layer such that they can move between a return stroke position and a forward stroke position, the grate bars each having a forward stroke face that is inclined with respect to a bulk material conveying direction and a flat rear face, each grate bar comprising a molded section configured in the forward stroke position together with the protective layer to form a cavity that is closed off with respect to the bulk material.

3. The apparatus as claimed in claim 2, wherein each grate bar rests with its rear face and its forward stroke face on a section of the protective layer which is arranged in various planes parallel to the forward stroke direction of the grate bar.

4. The apparatus as claimed in claim 2 or 3, wherein each forward stroke face has a forward stroke active area perpendicular to the forward stroke direction of the grate bar which is greater than a return stroke active area of the rear face perpendicular to the forward stroke direction of the grate bar.

5. The apparatus as claimed in claim 2 or 3, wherein each grate bar has an angled section forming the forward stroke face.

6. The apparatus as claimed in claim 2 or 3, wherein each grate bar comprises a profiled piece which is open at the bottom, the forward stroke face being formed by at least an outer side of the profiled piece and the rear face being formed by at least a further outer side of the profiled piece.

7. The apparatus as claimed in claim 2 or 3, wherein each forward stroke direction the grate bar is inclined with respect to the conveying direction.

8. The apparatus as claimed in claim 7, wherein each forward stroke direction of the grate bar is oblique to the conveying direction.

9. The apparatus as claimed in claim 2 or 3, wherein each edge region of the rear face facing away from the forward stroke direction has a chamfer formed thereon.

10. The apparatus as claimed in claim 2 or 3, wherein each grate bar can moved on a curved path between a return stroke position and a forward stroke position.

11. The apparatus as claimed in claim 2 or 3, wherein each grate bar is arranged such that it can pivot about an axis.

12. The method as claimed in claim 1, wherein the bulk material is cement clinker.

13. The apparatus as claimed in claim 2, wherein the bulk material is cement clinker.

14. The apparatus as claimed in claim 2 or 3, wherein the apparatus is configured so that the forward stroke face moves into cavity when in the return stroke position.

15. The apparatus as claimed in claim 14, wherein each forward stroke face has a forward stroke active area perpendicular to the forward stroke direction of the grate bar which is greater than a return stroke active area of the rear face perpendicular to the forward stroke direction of the grate bar.

16. The apparatus as claimed in claim 14, wherein each grate bar has an angled section forming the forward stroke face.

17. The apparatus as claimed in claim 14, wherein each grate bar comprises a profiled piece which is open at the bottom, the forward stroke face being formed by at least an outer side of the profiled piece, and the rear face being formed by at least a further outer side of the profiled piece.

18. The apparatus as claimed in claim 14, wherein each forward stroke direction of the grate bar is inclined with respect to the conveying direction.

19. The apparatus as claimed in claim 18, wherein each forward stroke direction of the grate bar is oblique to the conveying direction.

20. The apparatus as claimed in claim 14, wherein each edge region of the rear face facing away from the forward stroke direction has a chamfer formed thereon.

21. The apparatus as claimed in claim 14, wherein each grate bar can be moved on a curved path between a return stroke position and a forward stroke position.

22. The apparatus as claimed in claim 14, wherein each grate bar is arranged such that each grate bar can pivot about an axis.

* * * * *